Oct. 16, 1951     E. KOLLN     2,571,456

TRUCK FOR DEEP FREEZERS

Filed July 10, 1950

INVENTOR.
Edith Kolln
BY Arthur H. Sturges
Attorney.

Patented Oct. 16, 1951

2,571,456

UNITED STATES PATENT OFFICE 2,571,456

TRUCK FOR DEEP FREEZERS

Edith Kolln, Dow City, Iowa

Application July 10, 1950, Serial No. 172,965

1 Claim. (Cl. 280—34)

This invention relates to hand trucks particularly designed for heavy objects such as deep freeze units, and in particular a truck formed with spaced platforms carried by four caster wheels with upwardly extended handles at the ends and with adjustable telescoping side rails connecting the ends.

The purpose of this invention is to provide a hand truck having a low hung body that is formed with separable platforms so that the parts may be taken apart and assembled after being independently positioned under an object to be conveyed thereby.

In trucking heavy objects such as deep freeze units it is difficult to work the body or platform of the truck under the device without the use of portable hoists and the like and in many instances it is impossible to use equipment of this type. With this thought in mind this invention contemplates a four wheel truck body having telescoping side rails with spaced transversely disposed platforms carried by the side rails and with upwardly extended handles removably mounted on the ends of the side rails.

The conventional deep freeze unit, which is from five to seven feet long, two or three feet wide, and approximately four feet high weighs several hundred pounds and it is substantially impossible for one person to move one of these units from place to place in the home.

The object of this invention is, therefore, to provide a substantially flat four wheel hand truck that may readily be taken apart, placed under an object such as a deep freeze unit, piece by piece, and then reassembled under the unit.

Another object of the invention is to provide a hand truck for moving deep freeze units whereby the unit may be moved by one person.

Another object of the invention is to provide a four wheel hand truck for transporting deep freeze units in which the parts may readily be taken apart and assembled in compact relation for storage and shipping.

A further object of the invention is to provide a portable hand truck for handling heavy objects such as deep freeze units which is of a simple and economical construction.

With these and other objects and advantages in view the invention embodies a pair of spaced horizontally positioned transversely disposed parallel channel-shape platforms having tubular rails carried by the ends, telescoping tubes adjustably mounted on the inner ends of the rails, caster wheels carried by the ends of the platforms, and upwardly extended tubular handles removably mounted on the outer ends of the rails.

Other features and advantages of the invention will appear from the following description taken in connection with the drawings, wherein.

Figure 1:
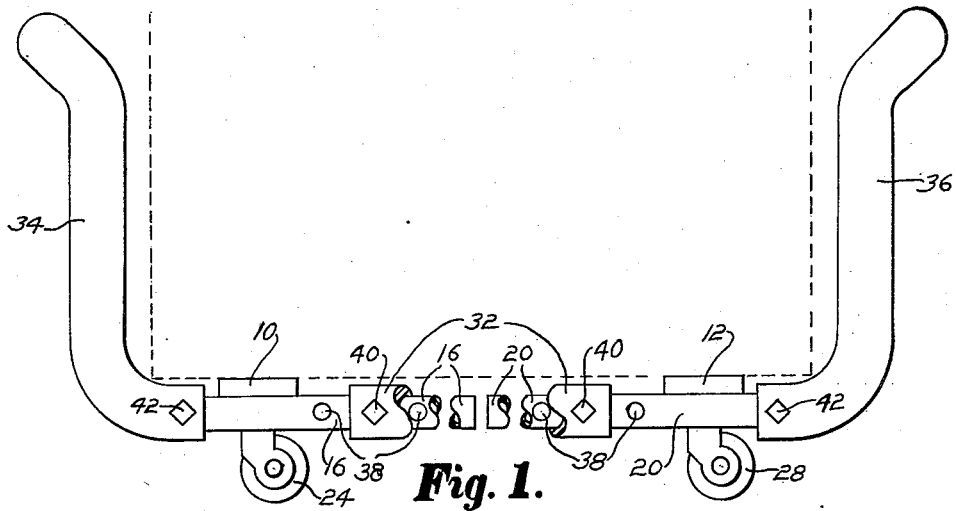
Figure 1 is a side elevational view of the truck with parts broken way and with a deep freeze unit indicated thereon in dotted lines.
Figure 2:
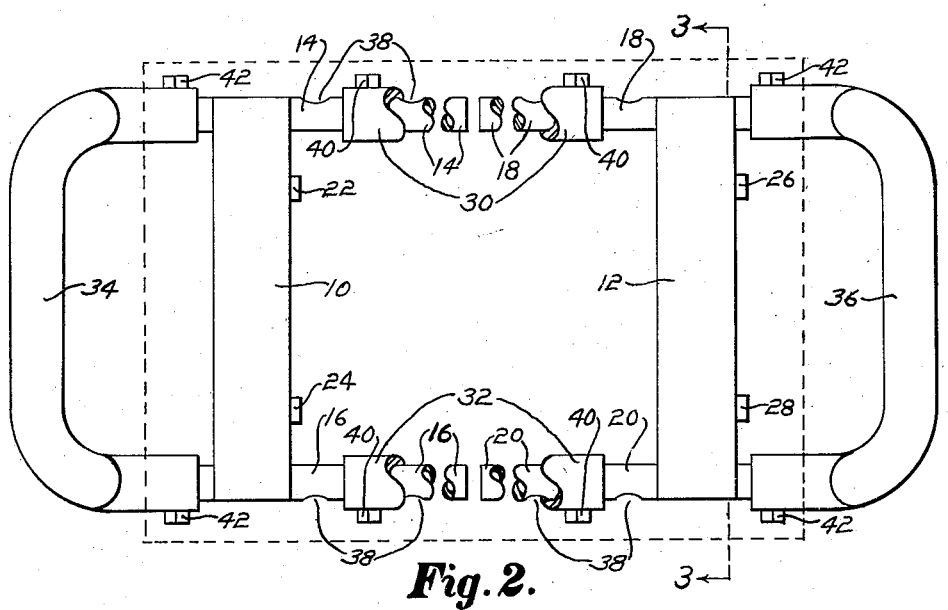
Figure 2 is a plan view also with parts broken away and also showing a deep freeze unit thereon in dotted lines.

Referring now to the drawings wherein like reference characters denote corresponding parts the improved heavy duty low hung hand truck of this invention includes transversely disposed platforms 10 and 12 with short tubular rails 14 and 16, on the ends of the platform 10, and similar short tubular rails 18 and 20 on the ends of the platform 12, caster wheels 22 and 24 on the platform 10 and similar wheels 26 and 28 on the platform 12, a telescoping side rail 30 connecting the ends of the rails 14 and 18, a similar side rail 32 connecting the inner ends of the rails 16 and 20, and handles 34 and 36, with the handle 34 positioned on the outer ends of the rails 14 and 16 and the handle 36 on the outer ends of the rails 18 and 20.

The outer surfaces of the inner ends of the rails carried by the ends of the platforms are provided with notches 38 which are positioned to receive the inner ends of set screws 40 in the ends of the telescoping side rails 30 and 32. The lower ends of the handles are provided with similar set screws 42 which removably hold the handles on the ends of the rails.

Figure 3:
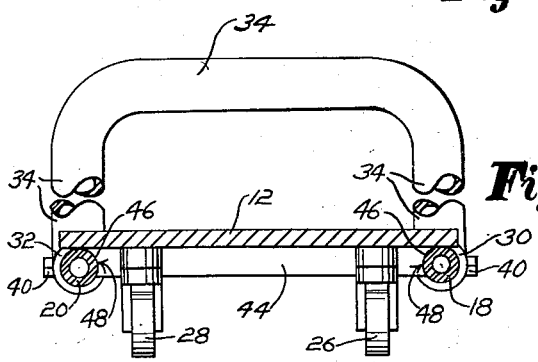
Figure 3 is a cross section through the truck taken on line 3—3 of Figure 2.

The platforms 10 and 12 are channel-shape in cross section and the depending flanges at the sides, as indicated by the numeral 44, are provided with arcuate end surfaces 46 that butt against the surfaces of the rails on the ends thereof, as shown at the point 48 in Figure 3. The ends of the flanges may be secured to the rails by welding or other suitable means.

The caster wheels are also secured to the under surfaces of the platforms by welding or other suitable means.

With the parts arranged in this manner the telescoping tubular side rails are removed from the inner ends of rails on the ends of the platforms and the handles are removed from the outer ends of the rails, when it is desired to collapse the truck for storing and shipping, and also when it is desired to position the truck under a heavy object such as a deep freeze unit. In mounting such a unit on the truck one end of the unit may be jacked up and one of the platforms inserted under the elevated end of the unit. With the end of the unit supported by this platform the opposite end is jacked up and the other platform is inserted under that end. With this end still jacked up the telescoping tubes are positioned on the inner ends of the side rails on the ends of the platforms, and the jack is removed. The handles are then installed on the outer ends of the rails, and with the parts assembled around the deep freeze unit in this manner it is possible to bring the handles comparatively close to the ends of the unit, thereby facilitating handling. The deep freeze unit may, therefore, be readily moved from one place to another by a single person, and when the truck is not in use it may be collapsed and stored in a comparatively small space.

From the foregoing description it is thought to be obvious that a deep freeze truck or carrier constructed in accordance with this invention is particularly well adapted for use by reason of the convenience and facility with which it may be assembled and operated, and it will also be obvious that this invention is susceptible of some change and modification without departing from the principles and spirit thereof, and for this reason I do not wish to be understood as limiting myself to the precise arrangement and formation of the several parts herein shown in carrying out my invention in practice, except as claimed.

Having thus fully described the invention what I claim as new and desire to secure by Letters Patent, is:

In a deep freezer truck, the combination which comprises a pair of transversely disposed parallel horizontally positioned platforms, longitudinally disposed parallel tubular rails with spaced notches in the surfaces under each end of each platform and positioned perpendicular to the platforms, depending flanges extended from the sides of the platforms and having arcuate recesses in the ends abutting the rails, said rails being nested in the arcuate recesses of the flanges of the platforms providing means for securing the rails to the platforms, the rails of one platform being aligned with the rails of the other platform and said rails being positioned end to end, tubular telescoping side rails with set screws therein positioned over the substantially meeting ends of the said rails extended from the platforms, said tubular side rails positioned with the set screws thereof in registering relation with the notches of the rails of the platforms whereby each platform is adjustably connected to the side rails and may be adjusted independently in relation to a load carried by said rails, vertically positioned U-shaped tubular handles having horizontally disposed lower ends with set screws therein positioned with the said lower ends extended over the ends of the rails whereby the handles extend upwardly from opposite ends of the truck and are removably attached to the ends thereof.

EDITH KOLLN.

REFERENCES CITED

The following references are of record in the file of this patent:

UNITED STATES PATENTS

| Number | Name | Date |
|---|---|---|
| 211,828 | Ash | Feb. 4, 1879 |
| 2,219,609 | Askeris | Oct. 29, 1940 |